United States Patent
Huang et al.

(10) Patent No.: US 9,282,303 B2
(45) Date of Patent: Mar. 8, 2016

(54) AUTOMATIC COLOR CORRECTION METHOD AND COLOR CORRECTION MODULE THEREOF

(71) Applicant: NOVATEK Microelectronics Corp., Hsin-Chu (TW)

(72) Inventors: Ming-Teng Huang, Hsinchu (TW); Wei Hsu, Taoyuan County (TW); Shen-Fu Tsai, Taoyuan County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 3 days.

(21) Appl. No.: 14/220,145

(22) Filed: Mar. 20, 2014

(65) Prior Publication Data

US 2015/0130964 A1     May 14, 2015

(30) Foreign Application Priority Data

Nov. 12, 2013    (TW) ............................... 102141151 A

(51) Int. Cl.
| | |
|---|---|
| *H04N 9/73* | (2006.01) |
| *H04N 5/357* | (2011.01) |
| *H04N 9/64* | (2006.01) |

(52) U.S. Cl.
CPC ............. *H04N 9/735* (2013.01); *H04N 5/3572* (2013.01); *H04N 9/646* (2013.01)

(58) Field of Classification Search
CPC ............................ H04N 9/73; H04N 5/3572
See application file for complete search history.

(56) References Cited

U.S. PATENT DOCUMENTS

| | | | | |
|---|---|---|---|---|
| 6,788,339 | B1* | 9/2004 | Ikeda | H04N 9/735 348/223.1 |
| 7,912,279 | B2* | 3/2011 | Hsu | H04N 1/6027 358/516 |
| 8,194,159 | B2* | 6/2012 | Wang | H01L 27/14625 348/251 |
| 8,692,903 | B2* | 4/2014 | Nomura | H04N 9/735 348/223.1 |
| 2008/0101690 | A1* | 5/2008 | Hsu et al. | 382/162 |
| 2008/0284877 | A1* | 11/2008 | Jaspers | H04N 9/646 348/241 |
| 2009/0021647 | A1 | 1/2009 | Choi | |
| 2009/0268053 | A1* | 10/2009 | Wang et al. | 348/229.1 |
| 2011/0199508 | A1 | 8/2011 | Nomura | |
| 2013/0016904 | A1 | 1/2013 | Okutsu | |

FOREIGN PATENT DOCUMENTS

| | | |
|---|---|---|
| CN | 101409792 A | 4/2009 |
| TW | 201311012 A1 | 3/2013 |

* cited by examiner

*Primary Examiner* — Ahmed A Berhan
(74) *Attorney, Agent, or Firm* — Winston Hsu; Scott Margo

(57) ABSTRACT

An auto-color-correction method for an image capturing device includes calculating a plurality color temperatures of a plurality of pixels in an image; calculating a number of pixels of the plurality of pixels located in a first color temperature range as a first number and a number of pixels of the plurality of pixels located in a second color temperature range as a second number; generating a color temperature weight according to the first number and the second number; and generating at least one correction coefficient according to the color temperature weight, at least one first coefficient corresponding to the first color temperature range and at least one second coefficient corresponding to the second color temperature range.

10 Claims, 4 Drawing Sheets

AUTOMATIC COLOR CORRECTION METHOD AND COLOR CORRECTION MODULE THEREOF

BACKGROUND OF THE INVENTION

1. Field of the Invention

The present invention relates to an auto color correction method and color correction module thereof, and more particularly, to an auto color correction method capable of adjusting the parameters utilized for color compensation according to the color temperature of the pixels in the image and color correction module thereof.

2. Description of the Prior Art

With advances of digital camera modules, almost all the electronic devices such as cell phones, tablets and personal digital assistants are now equipped with image capturing functions. When the electronic device with the digital camera module captures image, the electronic device needs to adjust the captured image according to different environment parameters for making the image become close to the image observed by the eyes. For example, the same object appears different colors under different light when capturing the image. Thus, the electronic device needs to adjust the color of the image according to the environment parameters for making the color shown in the image become close to the original color. In addition, the brightness of the image data in the surrounding of the image is weaker due to the limitations of the image sensor and the lens of the electronic device. The electronic device also needs to perform the lens shading correction (LSC) for correcting the brightness information of the image.

As can be seen from the above, how to adjust the image captured by the electronic device according to different environment parameters for making the image become closer to the image observed by the eyes becomes an important issue to be discussed.

SUMMARY OF THE INVENTION

In order to solve the above problem, the present invention provides an auto color correction method capable of adjusting the parameters utilized for the image correction and the color correction module thereof.

The present invention discloses an auto-color-correction method for an image capturing device, the auto-color-correction method comprises calculating a plurality color temperatures of a plurality of pixels in an image; calculating a number of pixels of the plurality of pixels located in a first color temperature range as a first number and a number of pixels of the plurality of pixels located in a second color temperature range as a second number; generating a color temperature weight according to the first number and the second number; and generating at least one correction parameter for image compensation according to the color temperature weight, at least one first parameter corresponding to the first color temperature range and at least one second parameter corresponding to the second color temperature range.

The present invention further discloses a color correction module for an image capturing device, the color correction module comprises a processing unit; and a storage unit, for storing a program code, wherein the program code instructs the processing unit to perform the following steps: calculating a plurality color temperatures of a plurality of pixels in an image; calculating a number of pixels of the plurality of pixels located in a first color temperature range as a first number and a number of pixels of the plurality of pixels located in a second color temperature range as a second number; generating a color temperature weight according to the first number and the second number; and generating at least one correction parameter for image compensation according to the color temperature weight, at least one first parameter corresponding to the first color temperature range and at least one second parameter corresponding to the second color temperature range.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
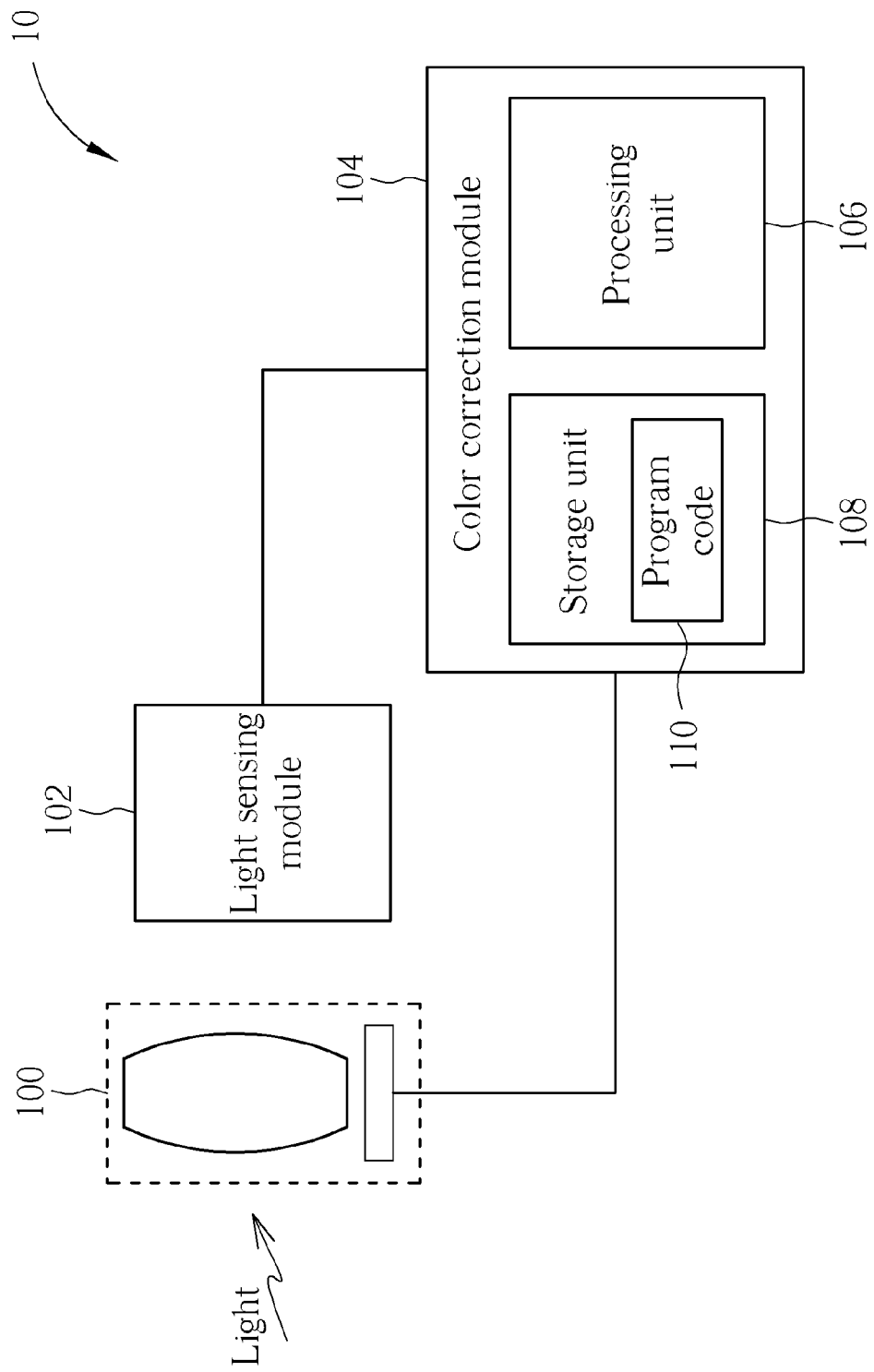
FIG. 1 is a schematic diagram of an image capturing device according to an embodiment of the present invention.

Please refer to FIG. 1, which is schematic diagram of an image capturing device 10 according to an embodiment of the present invention. The image capturing device 10 is an electronic device with an image capturing function such as a digital camera or a smart phone, and is not limited herein. The image capturing device 10 comprises a lens 100, a light sensing module 102 and a color correction module 104. The color correction module 104 comprises a processing unit 106, such as a microprocessor or Application Specific Integrated Circuit (ASIC), and a storage unit 108. The storage unit 108 may be any data storage device that can store a program code 110, accessed and executed by the processing unit 106 for controlling the lens 100 and the light sensing module 102 to capture images, appropriately. Examples of the storage unit 108 include but are not limited to a subscriber identity module (SIM), read-only memory (ROM), flash memory, random-access memory (RAM), CD-ROM/DVD-ROM, magnetic tape, hard disk and optical data storage device.

Figure 2:
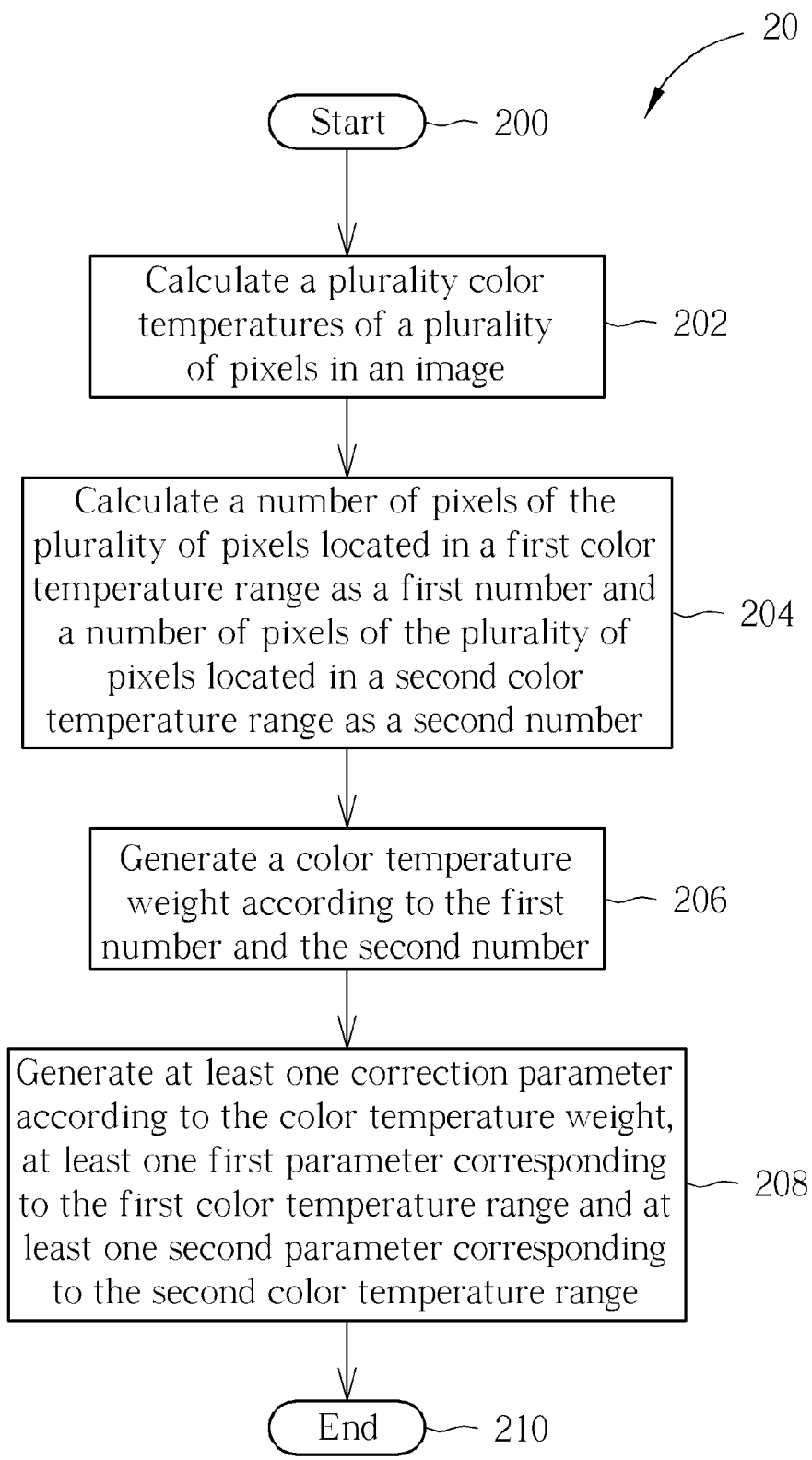
FIG. 2 is a flowchart of an auto color correction method according to an embodiment of the present invention.

Please refer to FIG. 2, which is a flowchart of an auto color correction method 20 according to an example of the present invention. The auto color correction method 20 can be compiled into the program code 110 shown in FIG. 1 and comprises the following steps:

Step 200: Start.

Step 202: Calculate a plurality color temperatures of a plurality of pixels in an image.

Step 204: Calculate a number of pixels of the plurality of pixels located in a first color temperature range as a first number and a number of pixels of the plurality of pixels located in a second color temperature range as a second number.

Step 206: Generate a color temperature weight according to the first number and the second number.

Step 208: Generate at least one correction parameter according to the color temperature weight, at least one first parameter corresponding to the first color temperature range and at least one second parameter corresponding to the second color temperature range.

Step 210: End.

According to the auto-color correction method 20, after the light sensing module 102 acquires the image via the lens 100, the processing unit 106 first calculates a plurality of color temperatures of a plurality pixels in the acquired image and calculates a number of pixels of the plurality of pixels located in a first color temperature range as a first number and a number of pixels of the plurality of pixels located in a second color temperature range as a second number. The processing unit 106 then acquires a color temperature weight according to the first number and the second number. Finally, the processing unit 106 generates the at least one correction parameter according to the color temperature weight, at least one first parameter and at least one second parameter, for using the at least one correction parameter to perform the image compensation. The at least one first parameter and the at least one second parameter may be the optimal parameters generated by the processing unit 106 for the image correction according to the first color temperature range and the second color temperature range, separately. As a result, the processing unit 106 can automatically adjusts the correction parameters used for compensating the image, to make the captured image becomes closer to the image observed by the eyes.

Figure 3:
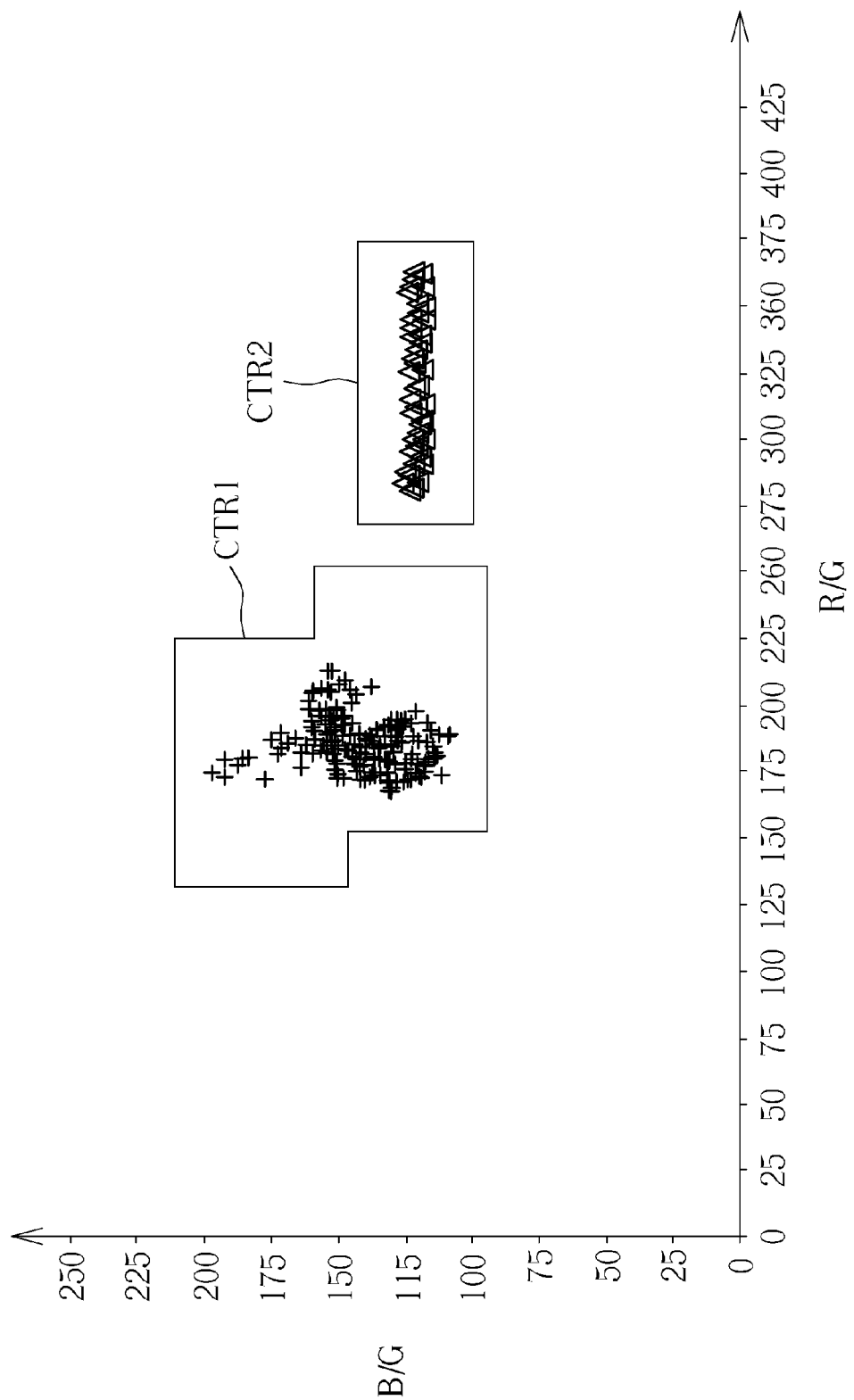
FIG. 3 is a color temperature distribution chart according to an embodiment of the present invention.

As to the details of the auto color correction method 20 please refer to the following. When the image capturing device 10 acquires (e.g. captures) an image IMG comprising pixels P1-Pn via the lens 100 and the light sensing module 102, the processing unit 106 calculates the color temperatures CT1-CTn of the pixels P1-Pn. For example, the processing unit 106 may calculate ratios $RG_1$-$RG_n$ between the red pixel values $R_1$-$R_n$ and the green pixel values $G_1$-$G_n$ of the pixels P1-Pn $$\left(\text{i.e. } RG_i = \frac{R_i}{G_i}, i \in 1\sim n\right)$$

and ratios $BG_1$-$BG_n$ between the blue pixel values $B_1$-$B_n$ and the green pixel values $G_1$-$G_n$ $$\left(\text{i.e. } BG_i = \frac{B_i}{G_i}, i \in 1\sim n\right),$$

separately. Next, the processing unit 106 acquires the color temperatures CT1-CTn of the pixels P1-Pn according to the ratios RG1-RGn and BG1-BGn. Please refer to FIG. 3, which is a color temperature distribution chart according to an embodiment of the present invention. As shown in FIG. 3, the horizontal axis of the color temperature distribution chart is the ratio between the red pixel value and the green pixel value of each pixel (i.e. the ratio $$\frac{R}{G}$$

shown in FIG. 3) and the vertical axis of the color temperature distribution chart is the ratio between the blue pixel value and the green pixel value of each pixel (i.e. the ratio $$\frac{B}{G}$$

shown in FIG. 3). Generally, the color temperature of a pixel is lower if the pixel locates at the righter or lower position in the color temperature distribution chart; and the color temperature of a pixel is higher if the pixel locates at the lefter or upper position in the color temperature distribution chart. For example, in comparison to the pixels locating in a color temperature range CTR1, the pixels locating in a color temperature range CTR2 equip with lower color temperature. In other words, the color shown by the pixels locating in the color temperature range CTR2 appear yellower and the color shown by the pixels locating in the color temperature range CTR1 appears bluer.

In order to optimize the correction parameters, the processing unit 106 calculates a number NUM1 of the pixels locating in the color temperature range CTR1 and a number NUM2 of the pixels locating in the color temperature range NUM2, and generates a color temperature weight W according to the numbers NUM1 and NUM2. In this embodiment, the color temperature weight $$W = \frac{NUM2}{NUM1 + NUM2}.$$

According to the color temperature weight W, the processing unit 106 generates the optimal correction parameters via using the optimal coefficients utilized for compensating the color temperature ranges CTR1 and CTR2. For example, when performing a chrominance compensation, the processing unit 106 generates a blue chrominance compensation parameter CB_GAIN_CTR1 and a red chrominance compensation parameter CR_GAIN_CTR1 according to the color temperature range CTR1 and generates a blue chrominance compensation parameter CB_GAIN_CTR2 and a red chrominance compensation parameter CR_GAIN_CTR2 according to the color temperature range CTR2. Next, the processing unit 106 adaptively generates a blue chrominance compensation parameter CB_GAIN and a red chrominance compensation parameter CR_GAIN according to the color temperature weight W, the blue chrominance compensation parameters CB_GAIN_CTR1 and CB_GAIN_CTR2, the red chrominance compensation parameters CR_GAIN_CTR1 and CR_GAIN_CTR2 and the following formula:

$$CB\_GAIN=(1-W)\times CB\_GAIN\_CTR1+W\times CB\_GAIN\_CTR2 \qquad (1)$$

$$CR\_GAIN=(1-W)\times CR\_GAIN\_CTR1+W\times CR\_GAIN\_CTR2 \qquad (2)$$

Via the formulas (1) and (2), the processing unit 106 adaptively adjusts the blue chrominance compensation parameter CB_GAIN and the red chrominance compensation parameter CR_GAIN according to the pixel data of the image IMG (i.e. color temperature weight W). The chrominance compensation can be optimized according to the color temperature, therefore. The processing unit 106 can appropriately compensate the image IMG under different environments and acquire the image IMG with the high color saturation.

Similarly, when compensating the red pixel value, the blue pixel value and the green pixel value of each pixel, the processing unit 106 generates color matrixes CM_CTR1 and CM_CTR2 according to the color temperature ranges CTR1 and CTR2, separately. For example, the color matrix CM_CTR1 may be $$\begin{bmatrix} RR1 & RG1 & RB1 \\ GR1 & GG1 & GB1 \\ BR1 & BG1 & BB1 \end{bmatrix}$$

and the color matrix CM_CTR2 may be $$\begin{bmatrix} RR2 & RG2 & RB2 \\ GR2 & GG2 & GB2 \\ BR2 & BG2 & BB2 \end{bmatrix}.$$

The detail operations of using the color matrix to compensate the red pixel value, the blue pixel value and the green pixel value of each pixel are illustrated as the following. Assuming a pixel of the image IMG equips with a red pixel value R_O, a green pixel value G_O and a blue pixel value B_O, the processing unit 106 first calculates a red pixel value R1, a green pixel G1 and a blue pixel value B1 according to the color matrix CM_CTR1, as shown in the following formula (3):

$$\begin{bmatrix} R1 \\ G1 \\ B1 \end{bmatrix} = \begin{bmatrix} RR1 & RG1 & RB1 \\ GR1 & GG1 & GB1 \\ BR1 & BG1 & BB1 \end{bmatrix} \begin{bmatrix} R\_O \\ G\_O \\ B\_O \end{bmatrix} \quad (3)$$

Next, the processing unit 106 calculates a red pixel value R2, a green pixel G2 and a blue pixel value B2 according to the color matrix CM_CTR2, as shown in the following formula (4):

$$\begin{bmatrix} R2 \\ G2 \\ B2 \end{bmatrix} = \begin{bmatrix} RR2 & RG2 & RB2 \\ GR2 & GG2 & GB2 \\ BR2 & BG2 & BB2 \end{bmatrix} \begin{bmatrix} R\_O \\ G\_O \\ B\_O \end{bmatrix} \quad (4)$$

Finally, the processing unit 106 generates a red pixel value R, a green pixel value G and a blue pixel value B corresponding to the compensated pixel, as shown in the following formula (5)

$$R=(1-W)*R1+W*R2$$

$$G=(1-W)*G1+W*G2$$

$$B=(1-W)*B1+W*B2 \quad (5)$$

Via using the color temperature weight W and the color matrixes CM_CTR1 and CM_CTR2, the processing unit 106 can adaptively adjust the red pixel value, the green pixel value and the blue pixel value of each pixel in the image IMG according to the formulas (3)-(5). As a result, the processing unit 106 can appropriately compensate the image IMG under different environments, such that the color shown in the image IMG become closer to that observed by the eyes after compensation.

Figure 4:
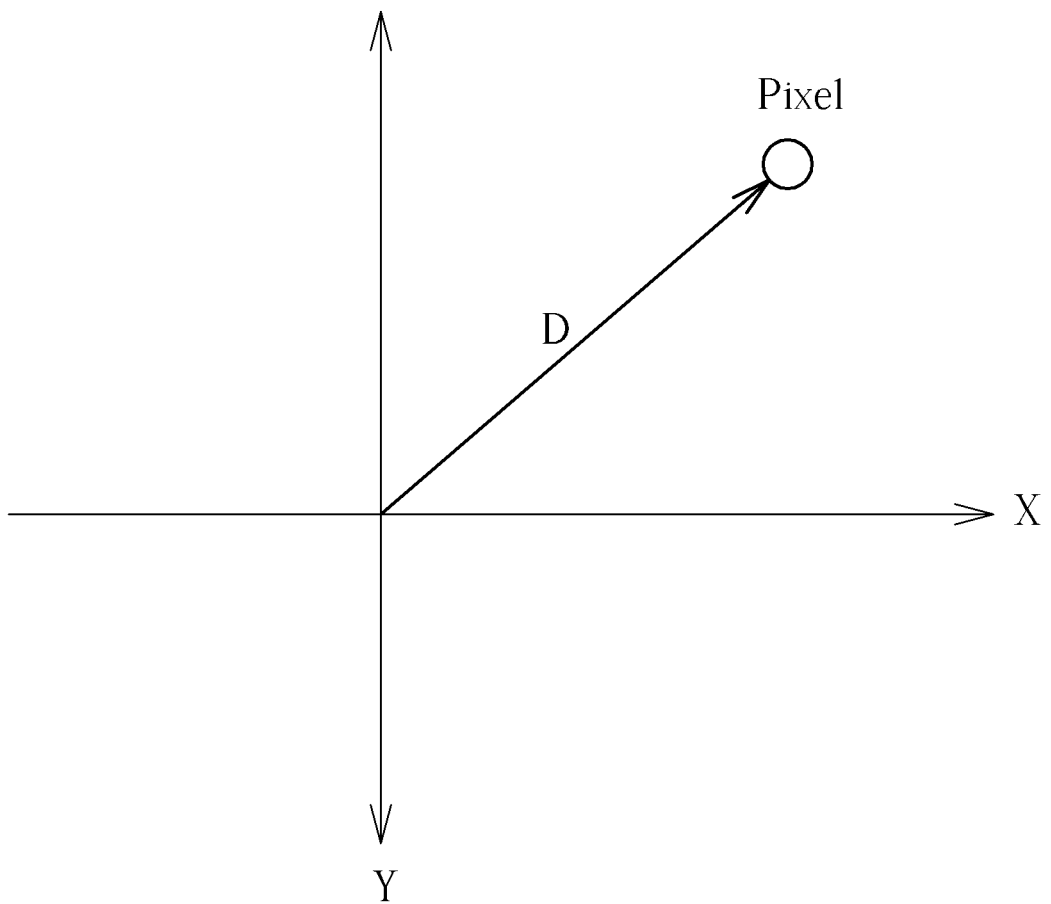
FIG. 4 is a schematic diagram of the distance between a pixel and a center point of the image according to an embodiment of the present invention.

In addition, when performing the lens shading correction (LSC) on the image IMG, the processing unit 106 generates correction parameters LSC_CTR1 and LSC_CTR2 according to the color temperature ranges CTR1 and CTR2, separately. Note that, the correction parameters LSC_CTR1 and LSC_CTR2 change with the distance D between the pixel and the center point of the image IMG (as shown in FIG. 4). The formula for generating the correction parameters LSC_CTR1 and LSC_CTR2 can be expressed as:

$$LSC\_CTR1 = CTR1\_A_0 \times D^2 + CTR1\_A_1 \times D + CTR1\_A_2 \quad (6)$$

$$LSC\_CTR2 = CTR2\_A_0 \times D^2 + CTR2\_A_1 \times D + CTR2\_A_2 \quad (7)$$

The parameters $CTR1\_A_0$-$CTR1\_A_2$ and $CTR2\_A_0$-$CTR2\_A_2$ are the quadratic coefficient, the monomial coefficient and the constant coefficient of the quadratic polynomial of the distance D, separately. Via using the color temperature weight W and the correction parameters LSC_CTR1 and LSC_CTR2, the processing unit 106 generates the correction parameter LSC utilized for the lens shading correction according to the following formula:

$$\begin{aligned} LSC &= (1-W) \times LSC\_CTR1 + W \times LSC\_CTR2 \quad (8) \\ &= [(1-W) \times CTR1\_A_0 + W \times CTR2\_A_0] \times D^2 + \\ &\quad [(1-W) \times CTR1\_A_1 + W \times CTR2\_A_1] \times D + \\ &\quad [(1-W) \times CTR1\_A_1 + W \times CTR2\_A_1] \end{aligned}$$

According to the formula (8), the processing unit 106 adaptively adjusts the correction parameter LSC (i.e. changes the quadratic coefficient, the monomial coefficient and the constant coefficient of the quadratic polynomial of the distance D) utilized for the lens shading correction according to the pixel information of the image IMG. The processing unit 106 therefore can appropriately compensate the image IMG under different environments and acquire the image IMG with the uniform brightness.

Please note that, the above embodiments adaptively adjust the compensation parameters utilized for color compensation via calculating the ratio between the numbers of pixels locating in different color temperature range. The image captured under different environments can be appropriately compensated and the performance of the image capture is therefore improved. According to different applications and design concepts, those with ordinary skill in the art may observe appropriate alternations and modifications.

Noticeably, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits such as microcircuits, microchips, or silicon chips. Examples of the electronic system can include system on chip (SOC), system in package (Sip), computer on module (COM), and the capacitive touch module 40.

To sum up, the auto-color- compensation method of the above embodiments adaptively adjusts the parameters utilized for the image correction according to different capturing environment. The image correction can be optimized, therefore, and the captured image can become closer to the image observed by the eyes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto-color-correction method for an image capturing device, the auto-color-correction method comprises:
   calculating a plurality color temperatures of a plurality of pixels in an image;

calculating a number of pixels of the plurality of pixels located in a first color temperature range as a first number and a number of pixels of the plurality of pixels located in a second color temperature range as a second number;

generating a color temperature weight according to a relation between the first number and the second number; and generating at least one correction parameter for image compensation according to the color temperature weight, at least one first parameter corresponding to the first color temperature range and at least one second parameter corresponding to the second color temperature range;

wherein the first color temperature range and the second colot temperature range are different.

2. The auto-color-correction method of claim 1, wherein the at least one correction parameter is utilized for Lens Shading Correction (LSC).

3. The auto-color-correction method of claim 1, wherein the at least one correction parameter is utilized for color correction.

4. The auto-color-correction method of claim 1, wherein the at least one correction parameter is utilized for color saturation correction.

5. The auto-color-correction method of claim 1, wherein the step of calculating the plurality color temperatures of the plurality of pixels in the image comprises:

calculate a first ratio between a red pixel value and a green pixel value of a first pixel of the plurality of pixels;

calculate a second ratio between a blue pixel value and the green pixel value of the first pixel of the plurality of pixels; and calculate the color temperature of the first pixel according to the first ratio and the second ratio.

6. A color correction module for an image capturing device, the color correction module comprises:

a processing unit; and a storage unit, for storing a program code, wherein the program code instructs the processing unit to perform the following steps:

calculating a plurality color temperatures of a plurality of pixels in an image;

calculating a number of pixels of the plurality of pixels located in a first color temperature range as a first number and a number of pixels of the plurality of pixels located in a second color temperature range as a second number;

generating a color temperature weight according to a relation between the first number and the second number; and generating at least one correction parameter for image compensation according to the color temperature weight, at least one first parameter corresponding to the first color temperature range and at least one second parameter corresponding to the second color temperature range;

wherein the first color temperature range and the second color temperature range are different.

7. The color correction module of claim 6, wherein the at least one correction parameter is utilized for Lens Shading Correction (LSC).

8. The color correction module of claim 6, wherein the at least one correction parameter is utilized for color correction.

9. The color correction module of claim 6, wherein the at least one correction parameter is utilized for color saturation correction.

10. The color correction module of claim 6, wherein the step of calculating the plurality color temperatures of the plurality of pixels in the image comprises:

calculate a first ratio between a red pixel value and a green pixel value of a first pixel of the plurality of pixels;

calculate a second ratio between a blue pixel value and the green pixel value of the first pixel of the plurality of pixels; and calculate the color temperature of the first pixel according to the first ratio and the second ratio.

\* \* \* \* \*